(No Model.)
M. M. CASS, Jr.
FISH HOOK.
No. 446,827.  Patented Feb. 17, 1891.
Fig. 1.
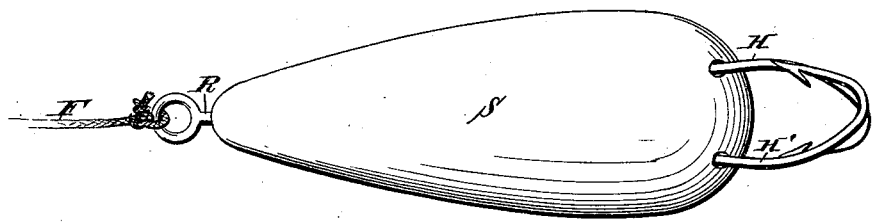
Fig. 2.
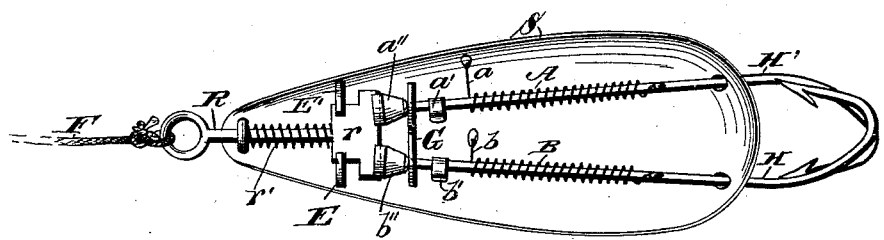
Fig. 3.
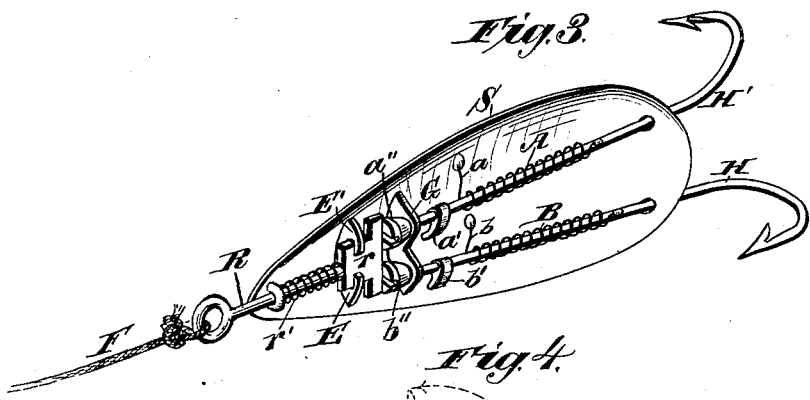
Fig. 4.
Witnesses.
Theodore Clark.
William M. Ernst
Inventor.
Marcus M. Cass, Jr.
By William R. Baird
Atty.

UNITED STATES PATENT OFFICE.

MARCUS M. CASS, JR., OF WATKINS, NEW YORK.

FISH-HOOK.

SPECIFICATION forming part of Letters Patent No. 446,827, dated February 17, 1891.

Application filed August 15, 1890. Serial No. 362,050. (No model.)

*To all whom it may concern:*

Be it known that I, MARCUS M. CASS, Jr., a citizen of the United States, residing at Watkins, Schuyler county, New York, have invented certain new and useful Improvements in Fish-Hooks; and I do declare the following to be a full, clear, and exact description of the invention, such as will enable others skilled in the art to which it appertains to make and use the same, reference being had to the accompanying drawings, and to the letters of reference marked thereon, which form part of this specification.

My invention relates to that class of fish-hooks designed to be used in connection with an artificial bait or spoon for trolling; and has for its object to provide a hook which will not be liable to have its motion arrested by the usual obstructions in the water, such as grass or weeds.

Its novelty consists in the construction and adaptation of the parts, as will be more particularly hereinafter pointed out.

Heretofore in hooks of this class known to me the hooks have either been concealed within an artificial bait and released by the positive bite of the fish or have been placed on the under side of a spoon and caused to be released by tension upon the line in a plane nearly parallel to the general surface of the spoon. Both methods are objectionable, the former because the class of bait used is inefficient, and the latter because the surface swept by the hooks is small. Their action is not positive, and they frequently fail to accomplish the purpose desired.

In my invention I provide suitable mechanism whereby the hooks are so held in position while traveling in the water that they are not liable to catch in grass or similar obstructions; but when the bait is seized by a fish and the line is subjected to the consequent tension the hooks are sprung outward from the spoon in directions oblique to the plane thereof and secure a very firm hold upon the fish.

In the drawings, Figure 1 is a side elevation of my improved device, showing the upper side of the spoon. Fig. 2 is a similar view showing the under side of the spoon with the hooks closed. Fig. 3 is a perspective view of the same with the hooks open, and Fig. 4 is a rear elevation of the same with the hooks closed, the direction of their movement while opening being shown by dotted lines.

In the drawings, S is the spoon or bait, provided on its under side with bearings E and E' for retaining the draw-plate in position and a guide G for the hooks. Under the spoon are secured two hooks H and H', the barbed portion of which projects outside of the spoon, and the shank of which passes through a suitable aperture in the side thereof. Around the shank of each hook is coiled a suitable spring A and B, each securely fastened at one end to the under surface of the spoon and at the other to the shank of the hook, and which spring tends to turn the hook open and throw it in a direction oblique to the plane of the spoon. Each shank is likewise provided with a lug $a'$ and $b'$, which prevents the hook from turning more than a predetermined distance by striking against the side of the spoon. At the rear end of each shank is a slotted head $a''$ and $b''$, adapted to engage when the hooks are closed with a draw-plate $r$, held in position by the guide-bearings E and E' and terminating in a straight bar R, which is provided with a ring, to which the line F may be secured. A spiral spring $r'$, wound around the rod R, tends to project the draw-plate $r$ toward the slotted heads of the hooks and to keep it in engagement therewith.

The operation of the device is as follows: The hooks are closed by turning them until the slots in the heads $a''$ and $b''$ engage with the draw-plate $r$. They are then held in place by the tension on the spring $r'$. The device is then placed in the water and trolled as usual. When it is seized by a fish a strain is brought upon the line F and transmitted to the rod R and draw-plate $r$, which is moved rearward and out of engagement with the slots in the heads $a''$ and $b''$. The springs A and B being thus left free to act quickly turn the hooks in the directions indicated by the arrow until further motion is prevented by the lugs $a'$ and $b'$ striking against the under surface of the spoon.

The advantages of my invention are easily perceived. The hooks are turned in a plane oblique to the plane of the spoon and hold the fish securely. Any number of hooks can be used with one spoon. The hooks and actuating mechanism take up no more room than the ordinary trolling-hook, and if the hooks are sprung open in the water the device becomes efficient as a simple open-spoon hook.

What I claim as new is—

1. The combination, with a spoon, of one or more hooks provided with springs tending to throw them into positions oblique to the plane of the spoon, each hook being provided with a slotted head adapted to engage with the draw-plate, which is thrown out of engagement by a pull upon the line, as shown and described.

2. The combination, with the spoon S, of one or more hooks II, each provided with a spring A, tending to throw the hook into action, a slotted head $b''$, adapted to engage with a draw-plate $r$, and a lug $b'$, adapted to control the throw of the hook and of the draw-plate $r$ and line F, whereby the said draw-plate is disengaged from the slotted heads of the hooks, as set forth.

3. In an artificial bait, the combination, with the spoon S, provided with the guide E E', adapted to retain the draw-plate in position, and the bearing G, in which the hooks rotate, of the hook II, provided with the spring A, tending to throw it into action, the slotted head $b''$, adapted to engage with the draw-plate $r$, and the lug $b'$, controlling the throw of the hook, as and for the purposes described.

4. In an artificial bait, the combination of the spoon S, provided with the guide E E', adapted to retain the draw-plate in position, and the bearing G, in which the hooks rotate, with the hook II, provided with the spring A, tending to throw it into action, the slotted head $b''$, adapted to engage with the draw-plate $r$, and the lug $b'$, controlling the throw of the hook and the said draw-plate $r$, provided with the spring $r'$, adapted to keep it in engagement with the slotted heads of the hooks, as set forth.

In testimony whereof I affix my signature in presence of two witnesses.

MARCUS M. CASS, JR.

Witnesses:
FRED. C. ROE,
JNO. M. THOMPSON.